May 5, 1959 J. H. TERPIN 2,885,230
WIPER ARM HEAD ASSEMBLY
Filed Oct. 11, 1957
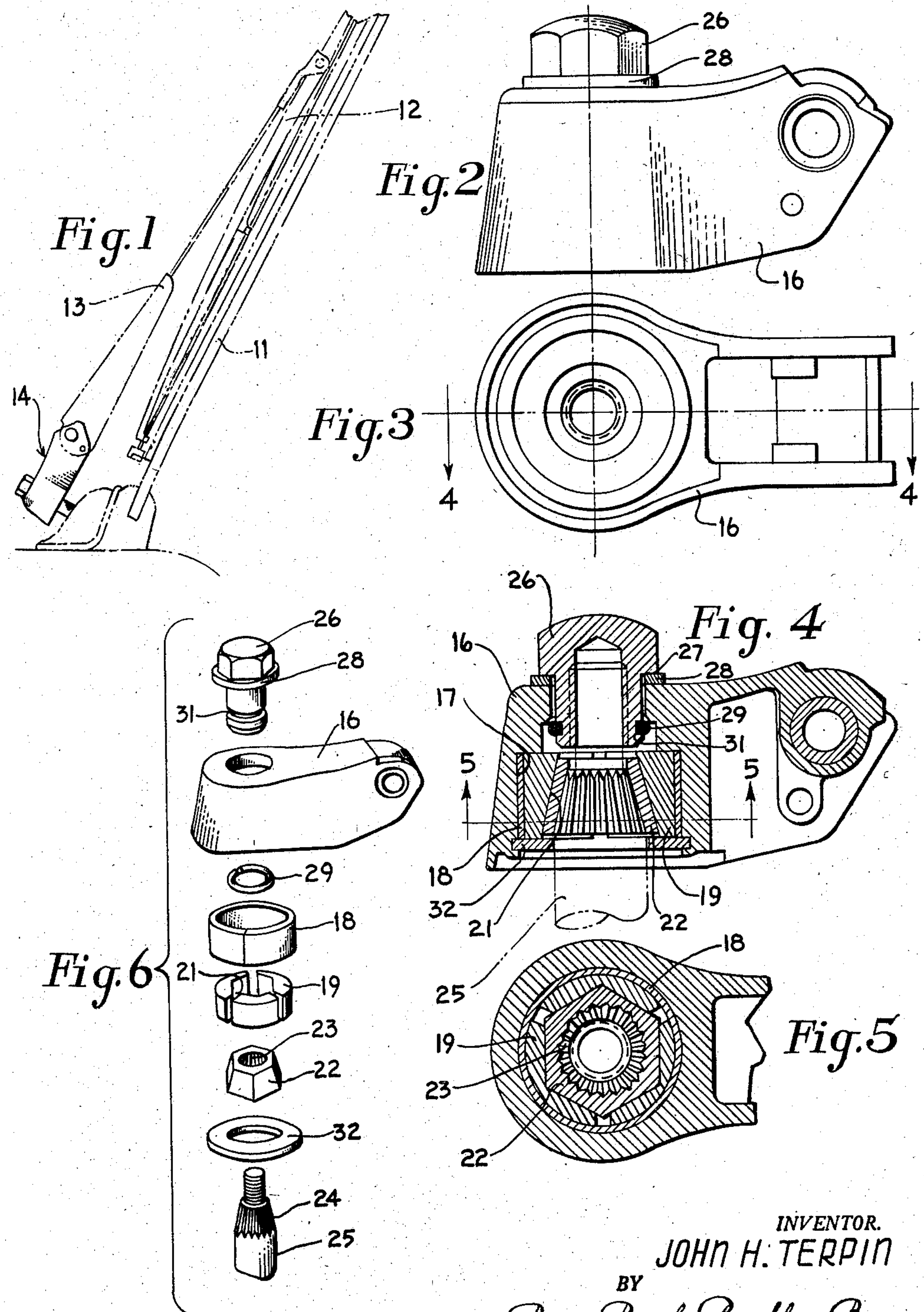
INVENTOR.
JOHN H. TERPIN
BY
Bean Brooks, Buckley + Bean.
ATTORNEYS United States Patent Office 2,885,230

Patented May 5, 1959

2,885,230

WIPER ARM HEAD ASSEMBLY

John H. Terpin, Buffalo, N.Y., assignor to Trico Products Corporation, Buffalo, N.Y.

Application October 11, 1957, Serial No. 689,653

13 Claims. (Cl. 287—53)

This invention relates to vehicle windshield cleaners, and more particularly to a mounting for a wiper arm.

The mounting of the present invention represents an improvement wherein a clutch device consisting of an adapter and a plurality of wedge elements provide uniform clutching contact between a rockshaft and a wiper arm as the tightening force of the clamping nut is increased. As a result, more uniform distribution of stress in the mounting is obtained resulting in an improved holding effect for the wiping arm. In addition, the present invention lends itself to more simplified fabrication thus resulting in lower manufacturing costs.

The main object of this invention is to provide an improved mounting for a windshield wiper arm.

Another object of this invention is to provide a windshield wiper mounting wherein a more uniform distribution of stress is obtained in a clutch sleeve as the tightening force of a clamping nut is increased.

A further object of the invention is to provide a wiper arm mounting which is simple in structure and use, which can be easily fabricated, and which will provide long and satisfactory service.

These and further objects and features of the invention will become more apparent from the following description and the accompanying drawing wherein:

Fig. 1 is a view showing a wiper arm mounting of the invention in operative position upon a windshield;

Fig. 2 is an elevation view of the mounting of Fig. 1;

Fig. 3 is a bottom plan view of the mounting shown in Fig. 2;

Fig. 4 is a section view as seen from line 4—4 in Fig. 3;

Fig. 5 is a section view as seen from line 5—5 in Fig. 4; and

Fig. 6 is an exploded view of the wiper arm mounting of Fig. 1.

Referring to the drawing, numeral 11 identifies the windshield of a motor vehicle having a wiper blade 12 arranged for wiping action upon the windshield, said wiper blade being positionably supported by a wiper arm 13 pivotally mounted upon a wiper arm mounting or a head assembly 14 embodying the principles of the invention.

The wiper arm head assembly 14 includes a body member 16 having a bore 17 adapted to receive a sleeve 18 which surrounds wedge members 19 formed to provide a hexagonally tapered inner surface 21 arranged for engagement with an adapter 22. The adapted has an internal tapered knurled surface 23 arranged for engagement with a tapered knurled shoulder 24 of a drive shaft 25. A nut 26 is arranged to extend into the body member to threadably engage the end of the drive shaft 25, said nut having a shoulder 27 which seats upon a washer 28 supported on the top surface of the body member, while a split ring 29 seats in a groove 31 formed near the inner end of the nut 26 to maintain the nut in position within the body member. The sleeve 18 is split to allow radial expansion thereof as the head assembly is tightened upon the drive shaft 25. A washer 32 is arranged to maintain the adapter 22, wedges 19, and the sleeve 18 within the body member 16, said body member having a portion which is peened to maintain the washer 32 in position, as best seen in Fig. 4.

From the foregoing it will be seen that if the nut 26 is rotated upon the end of the drive shaft 25, the body member 16 will be forced downwardly upon the drive shaft and simultaneously the adapter 22 will urge the wedge members 19 radially into tight engagement with the sleeve 18, so that the latter will snugly engage the bore 17 whereby the body member 16 will be firmly held on the drive shaft 25. The single taper arrangement between the adapter 22 and the wedge members 19, will cause a uniform stress throughout the full length of the sleeve 18 whereby the body member will be rigidly secured against rotary slippage upon the drive shaft 25. It will be further observed that the arrangement will allow for minute adjustments whereby the wiper blade 12 may be conveniently regulated to provide the proper wiping arc as required for effective wiping of the windshield. Such precise arcuate adjustment is not only desirable to achieve proper wiping action, but it is required to attain proper parking of the wiper blade after cessation of wiping operations. It is to be further noted that the arrangement of the invention allows wiper travel adjustment to be made any number of times without damage to the various elements of the wiper head assembly.

The foregoing description has been given in detail without thought of limitation since the inventive principles involved are capable of assuming other physical embodiments without departing from the spirit of the invention and the scope of the appended claims.

What is claimed is:

1. In a windshield wiper arrangement, a wiper arm head assembly including a body member, an adapter having a surface for engagement with a mating surface formed upon a drive shaft, a plurality of wedge members surrounding the adapter and having internal surfaces for sliding engagement with the adapter, a sleeve interposed between said wedge members and an inner surface of the body member, and a nut mounted on the body member and adapted for threadably engaging the end of the drive shaft whereby the wiper arm head assembly may be secured to the drive shaft.

2. In a windshield wiper arrangement, a wiper arm head assembly including a body member, an adapter having an internal surface for engagement with a tapered shoulder formed upon a drive shaft, wedge members surrounding the adapter and having internal surfaces for sliding engagement with a polygonal tapered outer surface formed on the adapter, a sleeve interposed between said wedge members and an inner surface of the body member, and a nut supported by the body member and arranged for threadable engagement with the end of the drive shaft whereby rotation of the nut will cause relative movement between the wedge members and the adapter resulting in a radially directed expansive force upon the sleeve to thereby maintain the wiper arm head assembly securely affixed to the drive shaft.

3. A wiper arm head assembly for supporting a windshield wiper in operative position upon a windshield, said assembly including a body member arranged for the pivotal support of a wiper arm, said body member being formed to provide a bore, a split sleeve positioned in the bore, a plurality of wedge members disposed in contact with the inner surface of said sleeve, said wedge members having tapered interior surfaces, an adapter having an external surface conforming to the interior surface of the wedge members and having an internal tapered knurled surface for engagement with a conforming tapered knurled shoulder formed upon a drive shaft, a washer positioned at one end of said bore and arranged to maintain the adapter, wedge members and sleeve in assembled condition, and a nut rotatably supported by the body member and having an internally threaded surface arranged for engagement with a threaded end of the drive shaft whereby rotation of the nut will force the body member axially upon the drive shaft and simultaneously develop radial force upon the split sleeve by virtue of the coaction between the tapered surfaces of the adapter and the wedge members.

4. A wiper arm head assembly for the support of a windshield wiper in operative position upon a windshield, said assembly including a body member arranged for the pivotal support of a wiper arm, said body member being formed to provide a bore, a cylindrical sleeve positioned in the bore and being split in an axial direction to permit radial expansion of said sleeve, a plurality of wedge members having outer surfaces arranged for full contact with the inner surface of said sleeve and having internal surfaces, an adapter having a tapered external surface conforming to the surfaces of the wedge members and an internal tapered knurled surface for engagement with a conforming tapered knurled shoulder formed upon a drive shaft, and a nut rotatably supported by the body member and having internal threads arranged for engagement with a threaded end of the drive shaft whereby rotation of the nut will force the body member axially upon the drive shaft and simultaneously develop radial force upon the sleeve by virtue of coaction between the tapered surfaces of the adapter and the wedge members whereby said assembly may be rigidly secured to the drive shaft.

5. A wiper arm head assembly for the support of a windshield wiper in operative position on a windshield, said assembly including a body member arranged for the pivotal support of a wiper arm, said body member being formed to provide a cylindrical bore, a cylindrical sleeve positioned in the bore and being split in an axial direction to permit radial expansion of said sleeve, wedging means including three wedge members arranged with the outer surfaces in full contact with the inner surface of said sleeve, each of said wedge members having two internal intersecting surfaces, a tapered adapter having an external surface of hexagonal cross-sectional area for mating with the internal intersecting surfaces of the wedge members and an internal tapered knurled surface for engagement with a conforming tapered knurled shoulder formed upon a drive shaft, and a nut rotatably supported by the body member and threadably engageable with the end of the drive shaft whereby rotation of the nut will force the body member axially upon the drive shaft and simultaneously develop radial force upon the sleeve by virtue of coaction between the surfaces of the adapter and wedge members whereby said wiper arm head assembly may be rigidly secured to the drive shaft.

6. A wiper arm head assembly for mounting a wiper arm on a rotatable drive shaft, said assembly comprising a body member arranged for the pivotal support of a wiper arm, said body member being formed to provide a cylindrical bore, a cylindrical sleeve positioned in the bore and being split in an axial direction to permit radial expansion of said sleeve, a plurality of wedge members having outer cylindrical conforming surfaces for engagement with the inner surface of said cylindrical sleeve and being internally tapered toward a point on the upper side of said body member, an adapter having an external surface conforming to the internal taper of the wedge members and an internal knurled surface tapering toward a point in the direction of the upper side of said body member and arranged for engagement with a conforming tapered knurled shoulder formed upon a drive shaft, and a nut rotatably supported in the upper surface of the body member and being arranged for threadable engagement with the end of the drive shaft whereby rotation of the nut will force the body member axially upon the drive shaft and simultaneously develop radial force upon the sleeve by virtue of coaction between the tapered surfaces of the adapter and the wedge members whereby said wiper arm head assembly may be rigidly affixed to the drive shaft.

7. A wiper arm head assembly for mounting a wiper arm on a rotatable drive shaft, said assembly comprising a body member arranged for the pivotal support of a wiper arm, said body member being formed to provide a cylindrical bore, a cylindrical sleeve positioned in the bore and being split in an axial direction to permit radial expansion of said sleeve, wedge means comprising three wedge members having outer cylindrical conforming surfaces for engagement with the inner surface of said cylindrical sleeve and being internally tapered toward a point on the upper side of said body member, an adapter having a tapered external surface conforming to the internal taper of the wedge members and an internal knurled surface tapering toward a point in the direction of the upper side of said body member and arranged for engagement with a conforming tapered knurled shoulder formed upon a drive shaft, a washer arranged in the end of the bore to maintain the wedge means in the bore, and a nut rotatably supported in the upper surface of the body member and being arranged for threadable engagement with the end of the drive shaft whereby rotation of the nut will force the body member axially upon the drive shaft and simultaneously develop radial force upon the sleeve by virtue of coaction between the tapered surfaces of the adapter and the wedge members whereby said wiper arm head assembly may be rigidly affixed to the drive shaft.

8. In a windshield wiper arrangement, a wiper arm head assembly including a body member, an adapter having an internal surface for engagement with a shoulder formed upon a drive shaft, a plurality of wedge members surrounding the adapter and having flat internal surfaces the adapter, said body member effectively having overhanging shouldered engagement with the wedge members to cause relative axial movement between the external faces of the adapter and the wedge members and thereby produce a radially directed expansive force in the direction of said body member for fixedly securing the wiper arm head assembly to such a shaft.

9. In a windshield wiper arrangement, a wiper arm head assembly including a body member, an adapter having an internal surface for engagement with a shoulder formed upon a drive shaft, a plurality of wedge members surrounding the adapter and having flat internal surfaces for sliding engagement with similar flat external faces on the adapter, said body member effectively having overhanging shouldered engagement with the wedge members to cause relative axial movement between the external faces of the adapter and the wedge members and thereby produce a radially directed expansive force in the direction of said body member for fixedly securing the wiper arm head assembly to such a shaft, and the external configuration of said adapter being polygonal in cross-section and said wedge members each having a pair of said flat internal surfaces convergingly related to conformably engage adjacent external faces of the adapter.

10. In a windshield wiper arm and shaft attachment, a wiper arm head assembly including a body member for rigid attachment to said shaft, a truncated cone-shaped shoulder on said shaft, a cylindrical recess in the said body member, a split cylindrical ring nested within said cylindrical recess, a one-piece member with an internal truncated cone-shaped surface of taper similar to that of the truncated cone surface on said shaft and with an outer surface in the form of a truncated pyramid having flat faces with the axis of this pyramid positioned longitudinally of the said shaft and its apex in the same direction as the apex of the truncated cone, and a multi-sectioned ring surrounding said truncated pyramid with flat surfaces on its inside arranged to mate with the flat surfaces of said truncated pyramid, the outer surface of said multi-sectioned ring being substantially cylindrical and nesting within the above mentioned split ring, a threaded portion on the outer end of said shaft, and a nut mating with said threaded portion and having a shoulder bearing upon the said body member for applying an endwise thrust to said body member relative to said shaft for the purpose of holding the assembled parts in firm solid engagement with each other.

11. In a windshield wiper arm and shaft attachment, a wiper arm head assembly including a body member for rigid attachment to said shaft, a truncated cone-shaped shoulder on said shaft, a cylindrical recess in the said body member, a one-piece member pierced through by an internal truncated cone-shaped surface of taper similar to that of the truncated cone surface on said shaft and with an outer surface in the form of a truncated pyramid having flat faces with axis of this pyramid positioned longitudinally of the shaft and with its apex in the same direction as the apex of the truncated cone, and a multi-sectioned ring surrounding said truncated pyramid with flat tapered surfaces on its inside so arranged as to mate with the flat faces of the said truncated pyramid, the outer surface of said multi-sectioned ring being substantially cylindrical and nesting within the above mentioned cylindrical recess, a threaded portion on the outer end of said shaft, and a nut mating with said threaded portion and having a shoulder bearing upon the said body member for applying an endwise thrust to said body member relative to said shaft for the purpose of holding the assembled parts in firm solid engagement with each other.

12. An arrangement for securing a windshield wiper arm to a rockshaft having a tapered shoulder thereon comprising a frusto-pyramidal adaptor having an internally tapered bore for complementary mating engagement with said shoulder, a plurality of wedge members having surfaces adapted to engage the outside of said frusto-pyramidal adaptor, an expansible ring member substantially surrounding said wedge members, said ring member being positioned within a bore within the head of said wiper arm, and fastening means operatively affixed relative to said wiper head, said fastening means adapted to engage said shaft to permit adjustment of said wiper arm relative to said shaft when said fastening means is in a loosened condition and to cause a wedging relationship between substantial areas of said shoulder of said shaft and the bore in said head through said adaptor, wedges, and ring member when said fastening means is in a tightened condition on said shaft.

13. In a windshield wiper arrangement, a wiper arm head assembly including a body member, an adapter having a surface for engagement with a mating surface formed upon a drive shaft, a plurality of wedge members surrounding the adapter and having internal surfaces for sliding engagement with the adapter, and a nut member mounted on the body member and adapted to threadably engage an end portion of said drive shaft to secure said body member to said drive shaft by converting relative axial movement between said nut member and said drive shaft into a radially directed expansive force through the wedging action produced by relative movement between said adapter and wedge members.

References Cited in the file of this patent

UNITED STATES PATENTS 2,723,139 Whiteley ---------------- Nov. 8, 1955

FOREIGN PATENTS 664,062 Great Britain ------------- Jan. 2, 1952

955,017 France ------------------ Feb. 20, 1947